US012620117B2

(12) United States Patent
Mine

(10) Patent No.: US 12,620,117 B2
(45) Date of Patent: May 5, 2026

(54) IMAGE PROCESSING DEVICE, NON-TRANSITORY COMPUTER-READABLE STORAGE MEDIUM, AND IMAGE PROCESSING METHOD

(71) Applicant: Mitsubishi Electric Corporation, Tokyo (JP)

(72) Inventor: Shingo Mine, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 293 days.

(21) Appl. No.: 18/237,937

(22) Filed: Aug. 25, 2023

(65) Prior Publication Data

US 2023/0401738 A1 Dec. 14, 2023

Related U.S. Application Data

(63) Continuation of application No. PCT/JP2021/012515, filed on Mar. 25, 2021.

(51) Int. Cl.
*G06T 7/70* (2017.01)
*G06T 7/50* (2017.01)
(Continued)

(52) U.S. Cl.
CPC ................... *G06T 7/70* (2017.01); *G06T 7/50* (2017.01); *G06T 15/00* (2013.01); *G06V 10/28* (2022.01);
(Continued)

(58) Field of Classification Search
CPC .. G06T 7/70; G06T 7/50; G06T 15/00; G06T 2207/10024; G06T 2207/20101; G06V 10/761; G06V 10/28; G06V 2201/07
See application file for complete search history.

(56) References Cited

U.S. PATENT DOCUMENTS 8,335,666 B2 * 12/2012 Tian ........................ G06T 7/593
703/2
2001/0030300 A1 10/2001 Shishido et al.
(Continued)

FOREIGN PATENT DOCUMENTS

CN 103886124 A 6/2014
CN 103985128 A 8/2014
(Continued)

OTHER PUBLICATIONS

German Office Action for German Application No. 11 2021 006 891.1, dated Jun. 17, 2024, with English translation.
(Continued)

*Primary Examiner* — Utpal D Shah
(74) *Attorney, Agent, or Firm* — Birch, Stewart, Kolasch & Birch, LLP

(57) ABSTRACT

An image processing device includes an object detecting unit that processes captured image data representing a captured image, which is an image including an object or detection target and a background of the object, to generate processed image data representing a processed image, which is an image in which the object is detected; an expected-data generating unit that generates expected data representing an expected image, which a virtual image in which the object represented by an attribute is placed at a position on the background on the basis of object data representing the position of the object and background data representing the background; and a detection-result determining unit that compares the processed image data and the expected data to determine whether or not the object is detected correctly in the processed image data.

11 Claims, 5 Drawing Sheets

(51) Int. Cl.

| | | |
|---|---|---|
| *G06T 15/00* | (2011.01) | |
| *G06V 10/28* | (2022.01) | |
| *G06V 10/74* | (2022.01) | |

(52) U.S. Cl.
CPC .. *G06V 10/761* (2022.01); *G06T 2207/10024* (2013.01); *G06T 2207/20101* (2013.01); *G06V 2201/07* (2022.01)

(56) References Cited

U.S. PATENT DOCUMENTS

| | | | | |
|---|---|---|---|---|
| 2009/0257084 | A1 | 10/2009 | Sakamoto | |
| 2010/0063617 | A1* | 3/2010 | Mori ...................... | B23Q 17/20 |
| | | | | 700/175 |
| 2014/0176530 | A1 | 6/2014 | Pathre | |

FOREIGN PATENT DOCUMENTS

| | | |
|---|---|---|
| DE | 10 2009 029 061 A1 | 3/2010 |
| DE | 10 2009 010 921 A1 | 9/2010 |
| DE | 10 2019 209 019 A1 | 12/2020 |
| JP | 10-318950 A | 12/1998 |
| JP | 11-101753 A | 4/1999 |
| JP | 2009-260575 A | 11/2009 |
| JP | 2014-38425 A | 2/2014 |
| JP | 6621351 B2 | 12/2019 |

OTHER PUBLICATIONS

International Search Report for PCT/JP2021/012515 mailed on Jun. 22, 2021.

Chinese Office Action and Search Report for Chinese Application No. 202180092834.8, dated Dec. 8, 2025, with English translation.

* cited by examiner 100, 200

LASER PROCESSING MACHINE

101

106

| LASER OSCILLATOR | | CONTROL DEVICE |

CONTROL DEVICE

106d — CPU

106a — ROM

106c — RAM

106b — HDD

102 — PROCESSING HEAD

103 — IMAGING DEVICE

104 — INPUT DEVICE

105 — DISPLAY DEVICE

107

101

102

109    108

- OBJECT NAME:
  PLATE MATERIAL
- DIMENSIONS:
  1000mm × 2000mm
- COLOR : WHITE
- PLACEMENT COORDINATES:
  (X, Y) = (100, 100)

IMAGE PROCESSING DEVICE, NON-TRANSITORY COMPUTER-READABLE STORAGE MEDIUM, AND IMAGE PROCESSING METHOD

CROSS REFERENCE TO RELATED APPLICATION

This application is a continuation application of International Application No. PCT/JP2021/012515 having an international filing date of Mar. 25, 2021.

BACKGROUND OF THE INVENTION

1. Field of the Invention

The disclosure relates to an image processing device, a non-transitory computer-readable storage medium, and an image processing method.

2. Description of the Related Art

A typical laser processing machine includes a laser oscillator that emits a laser beam, an optical path through which the laser beam passes, a processing head that concentrates and emits the laser beam, and a table on which a plate material is placed. During laser processing, the plate material to be processed is placed on the table of the laser processing machine, the processing head is moved in accordance with the coordinate system of the laser processing machine, and a laser beam is emitted for processing.

Nesting is performed in advance with the use of computer-aided design (CAD) to arrange the parts to be processed on the plate material to minimize material waste and maximize the number of parts obtained from a single sheet of material, which is effective in reducing material costs.

When a plate material is placed at an expected position and angle in the coordinate system of the laser processing machine, the parts can be obtained as nested, but in reality, the plate material may be placed on the table at a shifted position or angle. For example, when the plate material is manually placed on the table of the laser processing machine, the lack of a guide or the like indicating the position and angle of the plate material is likely to cause a shift in the position or angle. In an automated laser processing system, the plate material is placed on a detachable table in advance, and the entire table is automatically installed in the laser processing machine. In such a case, a shift in the position or angle is likely to occur due to vibration during installation.

A shift in the position or angle of the plate material causes a shift in the processing position of the plate material, precludes the acquisition of desired parts, and the material is wasted. In contrast, for example, the image processing device for laser processing described in Patent Literature 1 performs an operation with a captured image of a measurement target, position measurement data, and three-dimensional reference data, to calculate accurate position information of the measurement target. In such an image processing device, an imaging unit is so placed to face a lighting unit across a measurement target that illumination light from the lighting unit can transmit through a hole in the measurement target or the outer surface of the measurement target. The image processing device then captures the transmitted light at the imaging unit and acquires an image emphasizing the hole or the outline of the outer surface of the measurement target. This allows accurate determination of the position and angle of the measurement target, such as a plate material, without being affected by lighting conditions regarding illumination light or external light or image capture conditions such as the application state of cutting oil on the plate material.

Patent Literature 1: Japanese Patent No. 6621351

By providing a lighting unit and a position measuring unit, the detection rate of the measurement target can be improved, but the scale and the cost of the device increase.

Accordingly, it is an object of one or more aspects of the disclosure to enable the determination of whether or not an object has been detected accurately with a simple configuration.

SUMMARY OF THE INVENTION

An image processing apparatus according to an aspect of the disclosure includes: a processor to execute a program; and a memory to store the program which, when executed by the processor, performs processed of, processing captured image data representing a captured image, to generate processed image data representing a processed image, the captured image being an image including an object and a background of the object, the object being a detection target, the processed image being an image in which the object is detected; generating expected data representing an expected image on the background on a basis of object data representing a position of the object and background data representing the background, the expected image being a virtual image in which the object is placed at the position; and comparing the processed image data and the expected data to determine whether or not the object is detected correctly in the processed image data.

A non-transitory computer-readable storage medium storing a program according to an aspect of the disclosure causes a computer to execute processing comprising: processing captured image data representing a captured image, to generate processed image data representing a processed image, the captured image being an image including an object and a background of the object, the object being a detection target, the processed image being an image in which the object is detected; generating expected data representing an expected image on the background on a basis of object data representing a position of the object and background data representing the background, the expected image being a virtual image in which the object represented by the attribute is placed at the position; and comparing the processed image data and the expected data to determine whether or not the object is detected correctly in the processed image data.

An image processing method according to an aspect of the disclosure includes: processing captured image data representing a captured image, to generate processed image data representing a processed image, the captured image being an image including an object and a background of the object, the object being a detection target, the processed image being an image in which the object is detected; generating expected data representing an expected image on the background on a basis of object data representing a position of the object and background data representing the background, the expected image being a virtual image in which the object is placed at the position; and comparing the processed image data and the expected data to determine whether or not the object is detected correctly in the processed image data.

According to the disclosure, whether or not an object has been detected accurately can be determined with a simple configuration.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 8 is a block diagram schematically illustrating a configuration of an image processing device according to a second embodiment.

DETAILED DESCRIPTION OF THE INVENTION

First Embodiment

Figure 1:
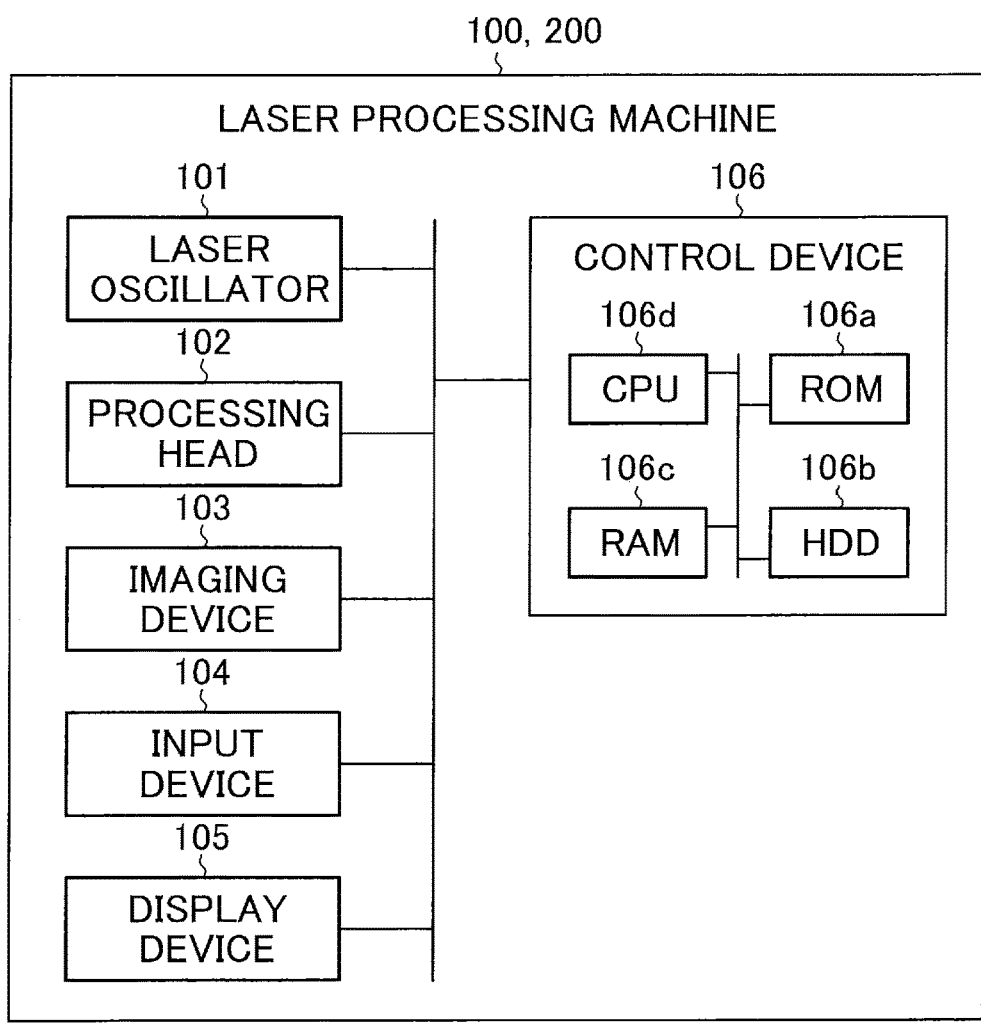
FIG. 1 is a block diagram schematically illustrating a configuration of a laser processing machine according to first and second embodiments.

FIG. 1 is a block diagram schematically illustrating a configuration of a laser processing machine 100 according to the first embodiment.

The laser processing machine 100 includes a laser oscillator 101, a processing head 102, an imaging device 103, an input device 104, a display device 105, and a control device 106.

The laser oscillator 101 is a device that emits a laser beam.

The processing head 102 is a device that concentrates and emits the laser beam.

Figure 2:
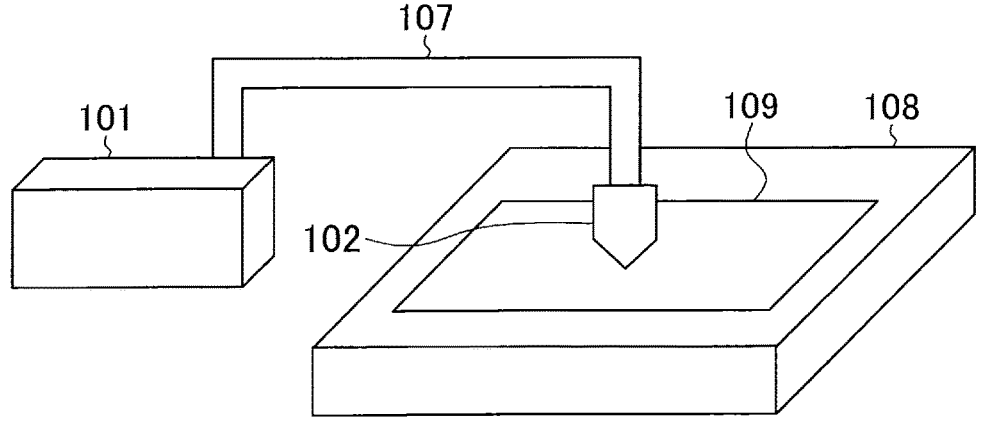
FIG. 2 is a schematic perspective diagram for describing a laser oscillator and a processing head.

FIG. 2 is a schematic perspective diagram for describing the laser oscillator 101 and the processing head 102.

As illustrated in FIG. 2, the laser oscillator 101 and the processing head 102 are connected by an optical path 107 through which the laser beam passes. During laser processing, a plate material 109 or processing target is placed on a table 108, the processing head 102 moves in accordance with the coordinate system of the laser processing machine 100, and the plate material 109 is processed by emitting a laser beam generated by the laser oscillator 101 from the processing head 102.

Referring back to FIG. 1, the imaging device 103 is a device that captures an image of objects and their background. For example, the imaging device 103 may be a camera, such as a charge-coupled device (CCD).

The input device 104 is a device that accepts input of various instructions from a user.

The display device 105 is a device that displays various screen images. For example, the display device 105 may be a programmable display that displays operation results or device status.

The input device 104 and the display device 105 may be composed of one device, e.g., a touch panel.

The control device 106 is a computer that controls the processing in the laser processing machine 100. For example, the control device 106 controls the operations of the laser oscillator 101, the processing head 102, the imaging device 103, the input device 104, and the display device 105.

The control device 106 includes a read only memory (ROM) 106a, a hard disk drive (HDD) 106b, a random access memory (RAM) 106c, and a central processing unit (CPU) 106d.

The ROM 106a is a nonvolatile memory that stores data and programs.

The HDD 106b is a storage device that stores data and programs. The HDD 106b is composed of a magnetic memory or the like and, for example, stores software that is a group of programs necessary for various types of processing by the CPU 106d. The programs constituting the various types of processing software for the CPU 106d may be preinstalled in the computer with dedicated hardware or preinstalled in the ROM 106a or the HDD 106b.

The RAM 106c is a volatile memory that provides a work area for the CPU 106d. The RAM 106c temporarily stores intermediate results of operations performed by the CPU 106d. The CPU 106d can write in or read the RAM 106c at high speed.

The CPU 106d loads a program stored in the ROM 106a or the HDD 106b into the RAM 106c and executes the program to control the processing in the laser processing machine 100. For example, the CPU 106d processes commands of various programs. The CPU 106d temporarily stores data required for each process in the RAM 106c or the HDD 106b.

The programs may be provided with a non-transitory computer-readable storage medium. The non-transitory computer-readable storage medium storing the programs may be a portable record medium such as a magnetic disk, a flexible disk, an optical disk, a compact disc, a Blu-ray (registered trademark) disc or a DVD (Digital Versatile Disc).

The control device 106 illustrated in FIG. 1 is implemented by a so-called computer, but the present embodiment is not limited to such an example. For example, the control device 106 may be implemented by a processing circuit, such as a system LSI.

In other words, the control device 106 can be implemented by processing circuitry.

Here, the image processing device according to the first embodiment is implemented by such a control device 106.

In the example illustrated in FIG. 1, the control device 106 is included in the laser processing machine 100, but alternatively, the control device 106 may be a device separate from the laser processing machine 100.

Figure 3:
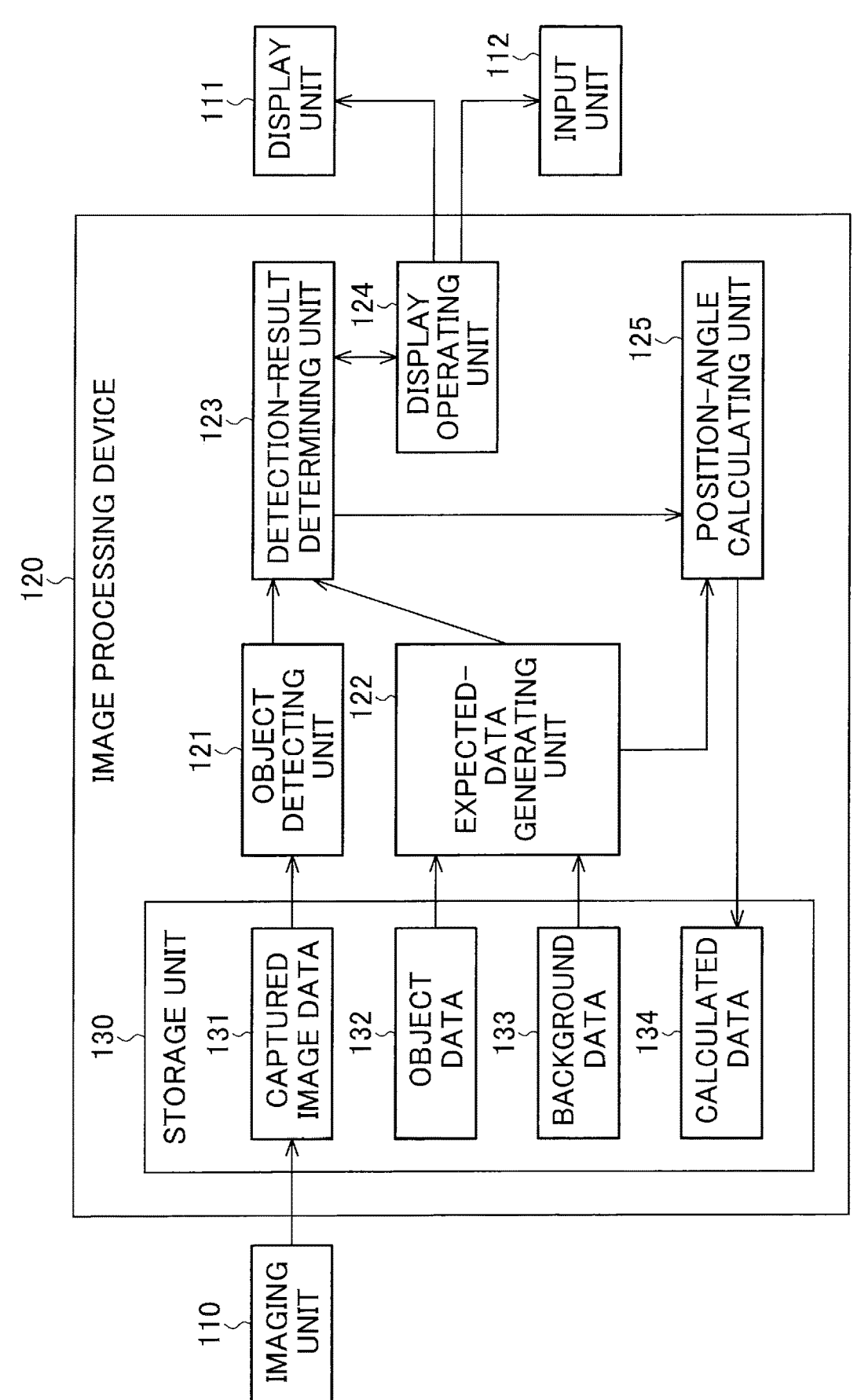
FIG. 3 is a block diagram schematically illustrating a configuration of an image processing device according to the first embodiment.

FIG. 3 is a block diagram schematically illustrating a configuration of an image processing device 120 according to the first embodiment.

The image processing device 120 includes a storage unit 130, an object detecting unit 121, an expected-data generating unit 122, a detection-result determining unit 123, a display operating unit 124, and a position-angle calculating unit 125.

The image processing device 120 is connected to an imaging unit 110, a display unit 111, and an input unit 112.

The imaging unit 110 is a function block implemented by the imaging device 103 illustrated in FIG. 1, which acquires an image of an object and a background and generates captured image data representing the image. The captured image data represents a captured image, which is an image including an object or detection target and a background of the object.

The display unit 111 is a function block implemented by the display device 105 illustrated in FIG. 1 and displays various screen images.

The input unit 112 is a function block implemented by the input device 104 illustrated in FIG. 1 and accepts input of various instructions.

The storage unit 130 stores data necessary for processing by the image processing device 120.

For example, the storage unit 130 stores captured image data 131, object data 132, background data 133, and calculated data 134.

The captured image data 131 is image data representing images captured by the imaging unit 110.

The object data 132 is data representing the attribute and position of an object or detection target. Here, examples of the attribute include a property name, which is the name of an object, the dimensions of the object, and colors of the object. The position is, for example, placement coordinates, which are coordinates of the position at which the object is placed. Here, the object or detection target is a plate material that has a rectangular shape. In other words, it is assumed that the type of object shape is predetermined. The attribute of the object data 132 may include the type of object shape. The dimensions included in the attribute specify the actual shape (which is a rectangular shape, here) of the object. In other words, the dimensions included in the attribute are information that can specify the object shape, and this information may include an object shape attribute.

The object data 132 may be data representing numerical values or text representing the dimensions, color, etc., of the object or data acquired in advance from digital design data (for example, CAD data) of the object or detection target.

The object data 132 may be registered in advance in a database (DB) or the like by a user and downloaded from the DB or may be imported from software or the like for creating a nesting program.

The background data 133 is data representing the background on which an object represented by object data is virtually placed. The background data 133 may be image data created by the imaging unit 110 by capturing the table 108 of the laser processing machine 100 without the object or detection target being placed.

The background data 133 may be image data digitally created by imitating the table 108 from information on the dimensions or colors of the table 108 of the laser processing machine 100 or image data simply representing a rectangular area that indicates the positional relationship of the object.

Alternatively, the background data 133 may be text data representing the size and position of the background area.

The text data may be stored as numerical text information of, for example, color, X coordinate, Y coordinate, width, and height and handled as image data in a scalable vector graphics (SVG) format during expected data generation.

Specifically, if text information with shape=rest, color=#33cc33, x=20, y=20, width=30, and height=30 is stored as below, background data can be generated by specifying information with fill=#33cc33, x="20," y="20," width="30," and height="30" for a rect element that draws a rectangle with a specified starting point and vertical and horizontal dimensions in SVG.

```
<?xml version="1.0" standalone="no" ?>
<!DOCTYPE svg PUBLIC "-//W3C//DTD SVG 20010904//EN"
"http://www.w3.org/TR/2001/REC-SVG-
20010904/DTD/svg10.dtd">
<svg width="100" height="100"
xmlns="http://www.w3.org/2000/svg">
<rect style="fill:#33cc33;" x="20" y="20" width="30"
height="30"/>
</svg>
```

The calculated data 134 is data representing the results calculated by the position-angle calculating unit 125.

For example, the calculated data 134 may be data representing a shift in the position and angle at which an object or detection target is placed.

The object detecting unit 121 detects an object placed on the table 108 in a captured image, which is an image represented by the captured image data 131.

The object detecting unit 121 only has to detect an object through known image processing, and the image processing to be used is not particularly limited.

In other words, the object detecting unit 121 processes the captured image data representing a captured image, which is an image including an object or detection target and a background of the object, to generate processed image data representing a processed image, which is an image in which the object is detected. The processed image data is given to the detection-result determining unit 123.

The expected-data generating unit 122 generates expected data on the basis of the object data 132 and the background data 133.

For example, the expected-data generating unit 122 generates expected data representing a virtual image corresponding to an object having the attribute represented by the object data 132 and placed at the position represented by the object data 132 on the background represented by the background data 133. The image represented by the expected data is also referred to as "expected image."

Figures 4A, 4B, 4C, 5A, 5B, 5C, 6A, 6B, 6C:
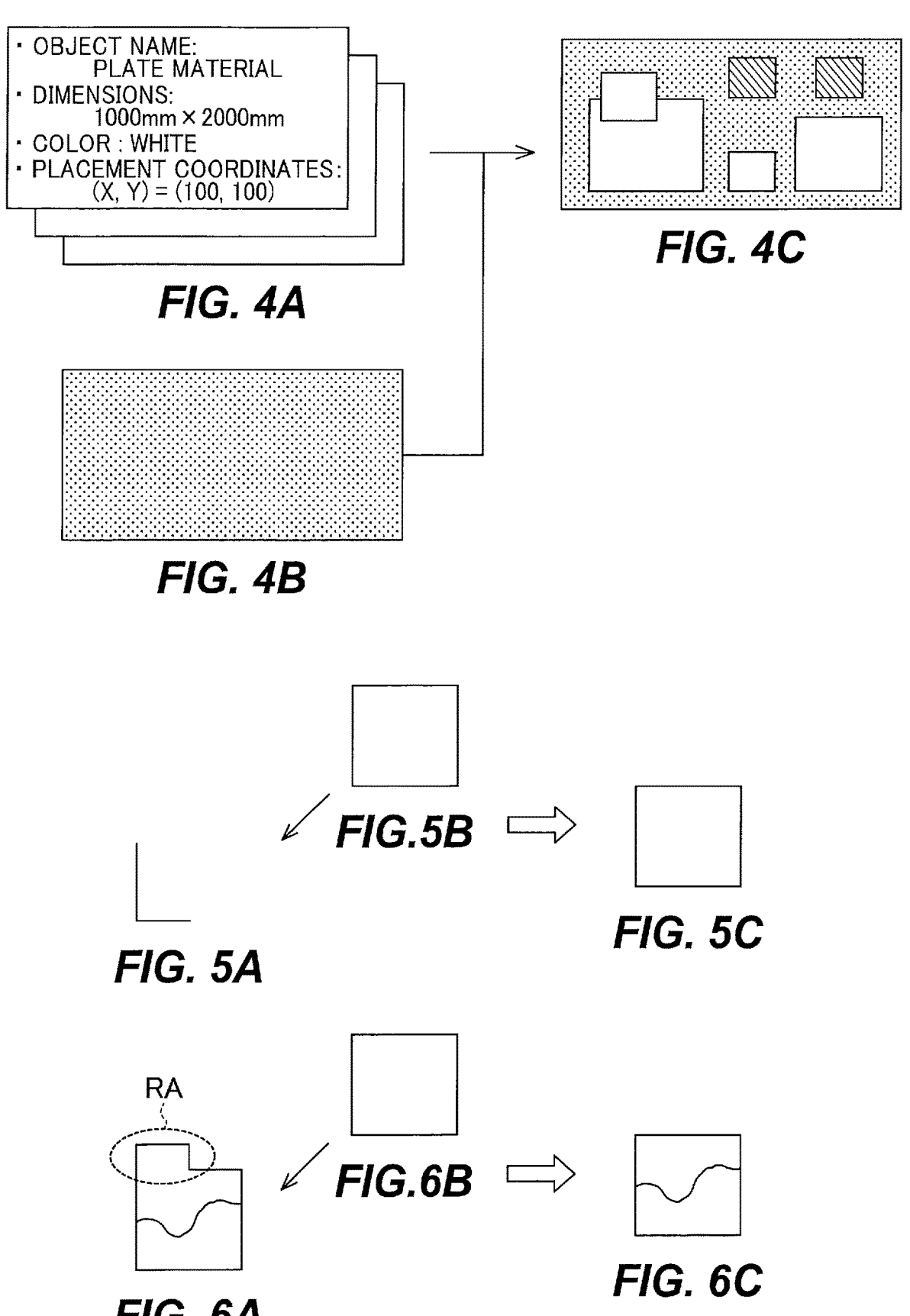
FIGS. 4A to 4C are schematic diagrams for explaining an operation of generating expected data.
FIGS. 5A to 5C are schematic diagrams for explaining a complementing process by a detection-result determining unit.
FIGS. 6A to 6C are schematic diagrams for explaining a modifying process by a detection-result determining unit.

FIGS. 4A to 4C are schematic diagrams for explaining an operation of generating expected data.

For example, on the basis of object data representing the dimensions, colors, and placement coordinates of objects as illustrated in FIG. 4A and background data representing a single-color background as illustrated in FIG. 4B, expected data representing an expected image, which is an image of the objects placed on a single-color background, is generated as illustrated in FIG. 4C. In FIG. 4A, the placement coordinates are specified as the positions of the objects.

Since the image data of an image represented by the expected data is substantially the same as that of an actual captured image, if objects cannot be detected correctly in the captured image, the image represented by the expected data can be used as data for complementing the shape, etc., of the objects to be detected.

The detection-result determining unit 123 compares the processed image data from the object detecting unit 121 with the expected data from the expected-data generating unit 122 to determine whether or not the objects have been detected correctly in the processed image data. For example, when the number of objects represented by the expected data matches the number of objects that can be specified in the processed image data from the object detecting unit 121, the detection-result determining unit 123 determines that the object detecting unit 121 is detecting the objects correctly.

When the object detecting unit 121 is unable to detect the objects correctly and portions of the objects are detected, the detection-result determining unit 123 refers to the expected data to complement the objects with portions of the objects in the processed image data.

FIGS. 5A to 5C are schematic diagrams for explaining a complementing process by the detection-result determining unit 123.

When the object detecting unit 121 detects a portion of an object as illustrated in FIG. 5A, the detection-result determining unit 123 can use an image of an object placed at a corresponding position in the expected data as illustrated in FIG. 5B to complement the object as illustrated in FIG. 5C.

For example, the detection-result determining unit 123 can determine to which object the detected portion belongs by using the detected portion as a template image and performing template matching on the expected image represented by the expected data. If the portion matches multiple objects, the detection-result determining unit 123 can determine to which object the portions belong on the basis of the positional relationship with other detected objects.

The detection-result determining unit 123 modifies the shape of the object detected by the object detecting unit 121 by using the expected data.

For example, if the shape of the object detected in the processed image data differs from the shape of the object represented by the expected data, the detection-result determining unit 123 refers to the expected data to modify the shape of the object detected in the processed image data.

FIGS. 6A to 6C are schematic diagrams for explaining a modifying process by the detection-result determining unit 123.

As illustrated in FIG. 6A, for example, when a black rectangular plate material is to be detected, the detected object may be merged with a black background. In FIG. 6A, an area RA surrounded by a dashed line is the portion of the object merged with the background, and thus the shape of the object is not detected correctly. Even in such a case, an image of the object placed at a corresponding position in the expected data as illustrated in FIG. 6B can be used to modify the shape of the object as illustrated in FIG. 6C.

When no object is detected in the processed image data, the display operating unit 124 accepts input of an operation by a user to specify the position of the object represented by the expected data in the processed image and adds the image of the object represented by the expected data to the processed image data.

For example, when the object detecting unit 121 has not been able to correctly detect an object and no portion of an object has been detected, the display operating unit 124 causes the display unit 111 to display the captured image represented by the captured image data 131 and the expected image represented by the expected data, and causes the input unit 112 to accepts input of the correlation between one or more objects included in the expected image and the position of the one or more objects in the captured image.

For example, the display operating unit 124 prompts a user to align the image of one or more objects included in the expected image to the corresponding one or more positions in the captured image through an operation such as drag and drop. The display operating unit 124 then gives the alignment result to the detection-result determining unit 123.

In this way, the detection-result determining unit 123 can add the image of the object included in the expected image to the image of the detection result from the object detecting unit 121.

As described above, the detection-result determining unit 123 generates target image data representing a target image, which is an image processed by complementing, modifying, or adding to the image represented by the processed image data from the object detecting unit 121, and gives the target image data to the position-angle calculating unit 125.

When it is not necessary to supplement, modify, or add to the processing result of the object detecting unit 121, the detection-result determining unit 123 gives the processed image data from the object detecting unit 121 to the position-angle calculating unit 125 as target image data.

The position-angle calculating unit 125 compares the object specified via the processed image data with the object represented by the expected data to calculate a shift in the position and angle of the object specified via the processed image data relative to the object represented by the expected data.

Specifically, the position-angle calculating unit 125 compares the target image data from the detection-result determining unit 123 with the expected data to calculate the shift in the position and angle of the object included in the target image data relative to the object included in the expected data. The position-angle calculating unit 125 then generates calculated data 134 representing the calculated shift and stores the calculated data 134 in the storage unit 130.

Figure 7:
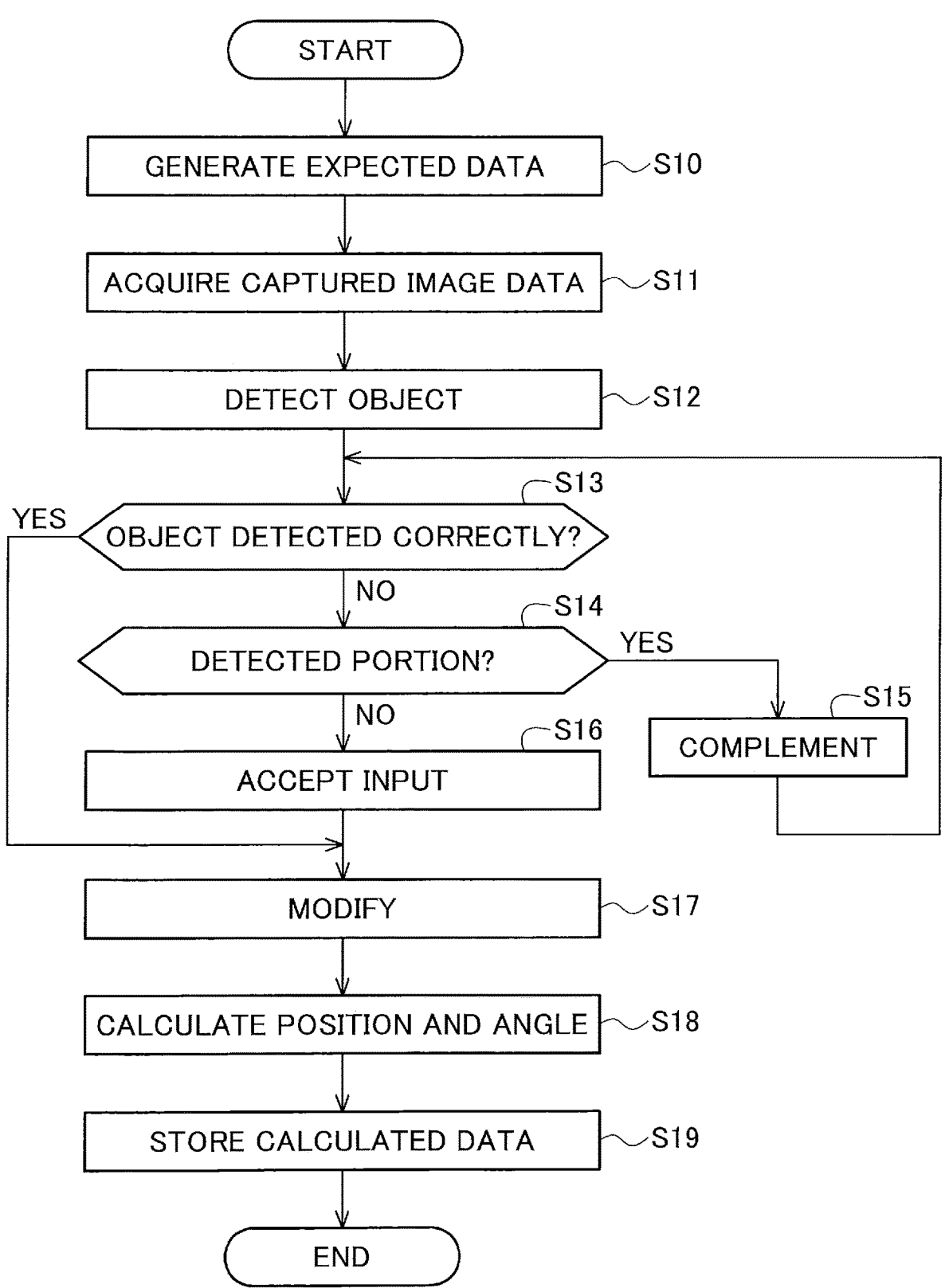
FIG. 7 is a flowchart illustrating an operation of an image processing device according to the first embodiment.

FIG. 7 is a flowchart illustrating the operation of the image processing device 120 according to the first embodiment.

First, the expected-data generating unit 122 reads the object data 132 and the background data 133 stored in the storage unit 130 and generates expected data from the object data 132 and the background data 133 (step S10). The generated expected data is given to the detection-result determining unit 123 and the position-angle calculating unit 125.

Alternatively, the generated expected data may be stored in the storage unit 130 and referred to by the detection-result determining unit 123 and the position-angle calculating unit 125 for use in processing by the respective components.

Next, the detection-result determining unit 123 reads the captured image data 131 generated by the imaging unit 110 capturing an image of objects or detection targets and a background from the storage unit 130 (step S11).

Next, the object detecting unit 121 executes image processing on the captured image represented by the captured image data 131 to perform object detection (step S12). The processed image data representing a processed image, which is an image obtained by executing image processing on the captured image, is given to the detection-result determining unit 123.

Next, the detection-result determining unit 123 compares the expected data with the processed image data to determine whether or not the objects have been detected correctly (step S13). Here, if the number of one or more objects included in the expected data matches the number of one or more objects detected in the processed image data, the detection-result determining unit 123 determines that the objects have been detected correctly. If the objects are detected correctly (Yes in step S13), the process proceeds to step S17, and if the objects are not detected correctly (No in step S13), the process proceeds to step S14.

In step S14, the detection-result determining unit 123 determines whether or not a portion of an object represented by the expected data is detected in the processed image data (step S14).

For example, the detection-result determining unit 123 determines whether or not corresponding objects are detected in the processed image data within predetermined ranges from the positions at which the objects represented by the expected data are placed. The detection-result determining unit 123 then specifies one object for which a corresponding object is not detected in the processed image data out of the objects represented by the expected data. The detection-result determining unit 123 then determines whether or not a portion of the specified object is detected at a predetermined position from the position at which the specified object is placed. Specifically, the detection-result determining unit 123 determines whether or not a contour coinciding with the contour of the specified object is detected in the processed image data at a predetermined position from the position at which the specified object is placed. If such a contour is detected, the detection-result determining unit 123 determines that a portion of the object represented by the expected data is detected in the processed image data.

If a portion of the object represented by the expected data is detected in the processed image data (Yes in step S14), the process proceeds to step S15, and if a portion of the object represented by the expected data is not detected in the processed image data (No in step S14), the process proceeds to step S16.

In step S15, the detection-result determining unit 123 complements the portion of the object detected in the processed image data by using the object represented by the expected data. For example, the detection-result determining unit 123 overlays the image of the object represented by the expected data on the portion detected in the processed image data so that the corresponding portions overlap each other. The process then returns to step S13, and the detection-result determining unit 123 determines whether or not the object has been detected correctly with the object complemented in step S15 added to the objects detected in the processed image data.

In step S16, the detection-result determining unit 123 instructs the display operating unit 124 to accept input from a user of the correlation between the component represented by the expected data and the component represented by the processed image data.

Next, the detection-result determining unit 123 compares the shape of the object represented by the processed image data with the shape of the corresponding object represented by the expected data, and if the shape of the object represented by the processed image data is not detected correctly due the relation with the background, etc., the detection-result determining unit 123 modifies the shape of the object represented by the processed image data with the shape of the corresponding component represented by the expected data (step S17).

Next, the position-angle calculating unit 125 uses the processed image data or the processed image data complemented, modified, or added to by the detection-result determining unit 123 or the display operating unit 124 as target image data, to calculate the shift between the position and angle of the object represented by the target image data and the position and angle of the corresponding object represented by the expected data (step S18).

The position-angle calculating unit 125 then generates calculated data 134 representing the calculated shift and stores the calculated data 134 in the storage unit 130 (step S19).

The calculated data 134 stored in this way is referred to by a program that moves the processing head and controls the processing path, and the processing path is corrected in accordance with the calculated data before processing is performed.

Second Embodiment

The second embodiment describes an example in which expected data is referred to in image processing used in object detection.

As illustrated in FIG. 1, a laser processing machine 200 according to the second embodiment, like the laser processing machine 100 according to the first embodiment, includes a laser oscillator 101, a processing head 102, an imaging device 103, an input device 104, a display device 105, and a control device 106.

The image processing device according to the second embodiment differs from the image processing device according to the first embodiment in that the image processing device according to the second embodiment is implemented by the control device 106.

Figure 8:
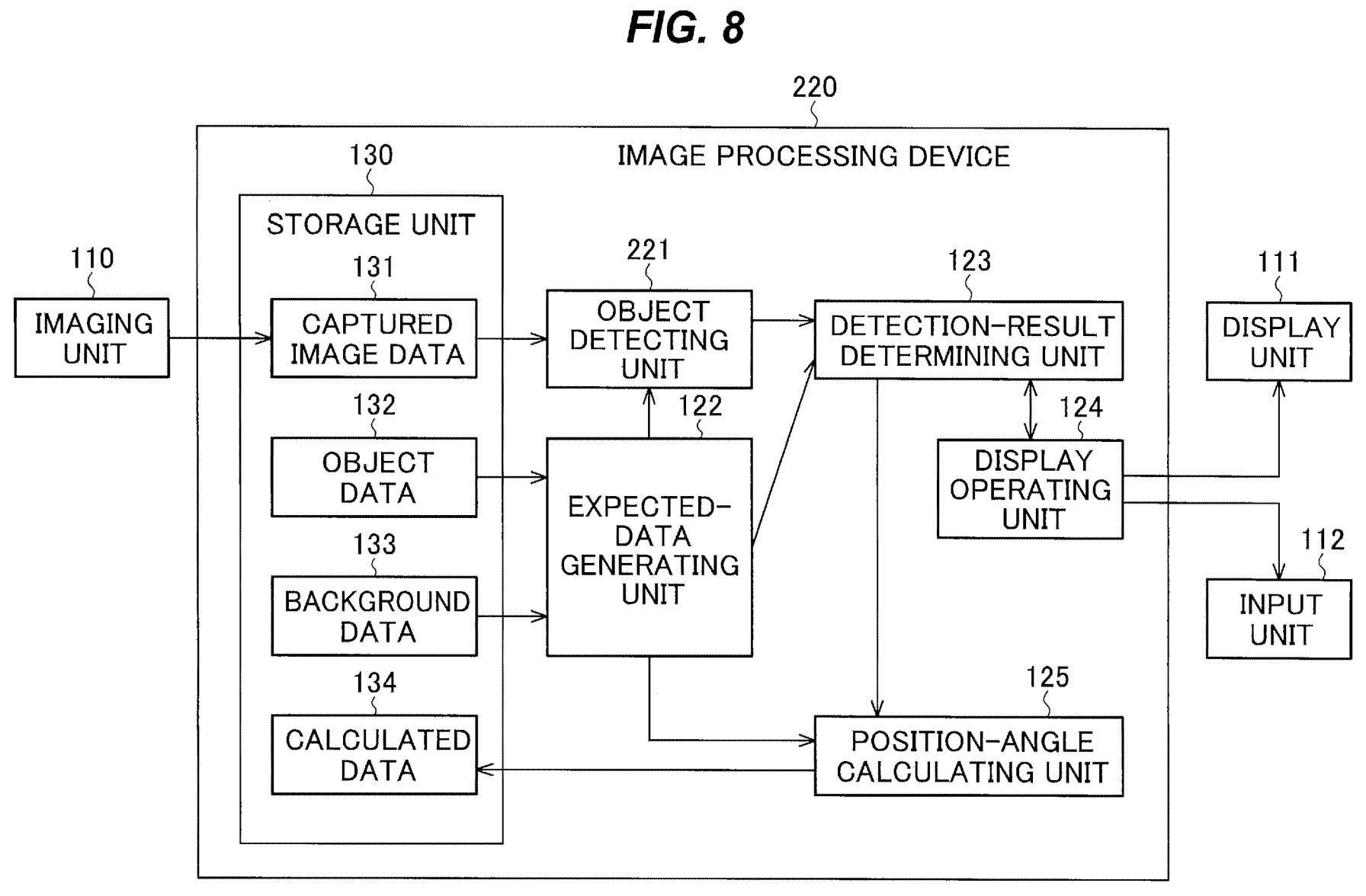

FIG. 8 is a block diagram schematically illustrating a configuration of an image processing device 220 according to the second embodiment.

The image processing device 220 includes a storage unit 130, an object detecting unit 221, an expected-data generating unit 122, a detection-result determining unit 123, a display operating unit 124, and a position-angle calculating unit 125.

The storage unit 130, the expected-data generating unit 122, the detection-result determining unit 123, the display operating unit 124, and the position-angle calculating unit 125 of the image processing device 220 according to the second embodiment are respectively the same as the storage unit 130, the expected-data generating unit 122, the detection-result determining unit 123, the display operating unit 124, and the position-angle calculating unit 125 of the image processing device 120 according to the first embodiment.

However, in the second embodiment, the expected-data generating unit 122 gives the generated expected data also to the object detecting unit 221.

Alternatively, the generated expected data may be stored in the storage unit 130 and referred to by the object detecting unit 221 for use in processing.

The object detecting unit 221 detects objects placed on the table 108 in a captured image, which is an image represented by the captured image data 131.

The object detecting unit 221 according to the second embodiment refers to expected data, preprocesses captured image data by using an adaptive binarization filter, and then detects objects in the background.

Since a simple binarization filter has a fixed threshold for the entire image, areas in which colors change depending on the lighting environment, etc., cannot be processed as expected. In contrast, the adaptive binarization filter does not have a fixed threshold and can establish a different threshold for each pixel because the threshold is set to an average pixel value of a target pixel and pixels around the target pixel. Therefore, by using an adaptive binarization filter, even areas in which colors change depending on the lighting environment can be processed as expected. In this case, the adaptive binarization filter sets a local area of any size in the overall image, calculates the threshold in this area, binarizes each pixel individually, and scans the local area over the overall image, to perform binarization of all pixels in the image "with a threshold tailored to each area."

A typical adaptive binarization filter performs binarization by allowing a user to select the size of a local area and executing the following processes 1 to 3.

1: The following processes 2 and 3 are performed on all pixels.

2: A threshold is calculated by using the pixels in the local area (for example, length×width=7×7 pixels) that are the pixels around the target pixel. Here, the threshold is usually an average, an intermediate value, or (maximum+minimum)/2 of the pixel values of the pixels in the local area.

3: Binarization is performed depending on whether or not the pixel value of the target pixel is more or less than the threshold determined in the process 2 above.

In a typical adaptive binarization filter, the size of the local area is rather large so that the background and foreground can be distinguished.

In contrast, in the second embodiment, the object detecting unit 121 can reduce the size of the local area as the similarity between the background color and the object color is low by referring to the expected data.

Here, the color similarity may be specified by a known method, and, it only needs to be determined that, for example, the smaller the color difference is, the higher the similarity becomes.

The object detecting unit 121 can automatically determine an area near the edge of an object represented by the expected data as a local area.

For example, the object detecting unit 121 can determine a local area so that a target pixel is a pixel in a predetermined area containing pixels forming the edge of the object represented by the expected data. In other words, the object detecting unit 121 can execute processing using an adaptive binarization filter only on the predetermined area that is part of the captured image and includes the edge of the object represented by the expected data. In such a case, the unused pixels can be treated as the background or interior of the object.

The object detecting unit 121 can alternatively perform binarization by using only pixels in a predetermined area including pixels where the object or plate material represented by the expected data is placed, instead of using all pixels of the captured image represented by the captured image data. In other words, the object detecting unit 121 can execute processing using an adaptive binarization filter only on a predetermined area that is part of the captured image and includes the object represented by the expected data. In such a case, the unused pixels can be treated as the background.

The adaptive binarization filter does not produce a clean processing result if the area where the color does not change is large, but in the second embodiment, the area corresponding to the interior of the object and the background can be excluded from the processing target by referring to the expected data.

Here, a binarization filter is described as an example of image processing, but the image processing method to which the present invention is applied is not specified.

As described above, according to the first or second embodiment, it is possible to determine whether or not an object is detected correctly by comparing the detection result of an object in a captured image with expected data prepared in advance. In this way, the expected data can be used to complement or add to the detection results when an object is not detected correctly. Even in a case where the object is detected correctly, the expected data can be used to modify the shape of an object.

The expected position or edge of an object or detection target can be determined relative to the background data in advance. Therefore, as in the second embodiment, by detecting an object through image processing with reference to expected data and subjecting only a limited area such as the object or detection target and its vicinity to image processing, the image processing can be accelerated, and the accuracy of object detection can be enhanced. As a result, the accuracy of object detection can be enhanced without a three-dimensional measuring unit or a lighting unit, and a system that can calculate the position and angle of an object can be provided with a low-cost configuration.

Conventional devices that measure the position of an object by moving a contact sensor attached to a processing head are time-consuming because multiple physical contact points on the object are used to make measurements. In contrast, the image processing devices 120 and 220 according to the first and second embodiments measure the position of an object through image processing and are advantageous in that they are able to detect the position and angle of the object in a shorter time than that of the conventional devices.

Devices that detect objects through conventional image processing sometimes have difficulty in accurate detection due to various factors such as a reflection of illumination light, a reflection of external light, and the existence of cutting oil applied on the objects for laser processing, and this sometimes increases the misidentification rate of object position information. In the prior art literature described in the background art, a lighting unit and a position measuring unit are provided for accurate detection of a measurement target, but the scale and cost of the device is high. In contrast, the image processing devices 120 and 220 according to the first and second embodiments do not require a lighting unit and a position measuring unit, so that the misidentification rate of object position information can be reduced with a device that is less costly than the device that performs object detection through conventional image processing.

What is claimed is:

1. An image processing device comprising:

a processor to execute a program; and a memory to store the program which, when executed by the processor, performs processes of, processing captured image data representing a captured image, to generate processed image data representing a processed image, the captured image being an image including an object and a background of the object, the object being a detection target, the processed image being an image in which the object is detected;

generating expected data representing an expected image on a basis of object data representing a position and an attribute of the object and background data representing the background, the expected image being a virtual image in which the object is placed at the position on the background, the attribute including information that enables a shape and a color of the object to be specified; and comparing the processed image data and the expected data to determine whether or not the object is detected correctly in the processed image data, wherein the processor refers to the expected data and processes the captured image data through image processing, to detect the object in the background, the image processing being processing with an adaptive binarization filter, the processor reduces the size of a local area of the adaptive binarization filter as similarity between a color of the object represented by the expected data and a color of the background represented by the expected data is low, and when the shape of the object detected in the processed image data differs from a shape of the object represented by the expected data, the processor refers to the expected data to modify the shape of the object detected in the processed image data.

2. The image processing device according to claim 1, wherein when a portion of the object is detected in the processed image data, the processor refers to the expected data to complement the object on a basis of the portion in the processed image data.

3. The image processing device according to claim 1, wherein the processor accepts input of an operation by a user when the object is not detected in the processed image data, to specify a position of the object represented by the expected data in the processed image and adds an image of the object represented by the expected data to the processed image data.

4. The image processing device according to claim 1, wherein the processor refers to the expected data and processes the captured image data through image processing, to detect the object in the background.

5. The image processing device according to claim 4, wherein the image processing is processing with an adaptive binarization filter.

6. The image processing device according to claim 5, wherein the processor executes processing with the adaptive binarization filter only on a predetermined area including the object represented by the expected data, the predetermined area being a portion of the captured image.

7. The image processing device according to claim 5, wherein the processor executes processing with the adaptive binarization filter only on a predetermined area including an edge of the object represented by the expected data, the predetermined area being a portion of the captured image.

8. The image processing device according to claim 1, wherein the processor compares the object specified via the processed image data with the object represented by the expected data to calculate a shift in a position and an angle of the object specified via the processed image data relative to the object represented by the expected data.

9. An image processing method comprising:

processing captured image data representing a captured image, to generate processed image data representing a processed image, the captured image being an image including an object and a background of the object, the object being a detection target, the processed image being an image in which the object is detected;

generating expected data representing an expected image on a basis of object data representing a position and an attribute of the object and background data representing the background, the expected image being a virtual image in which the object is placed at the position on the background, the attribute including information that enables a shape and a color of the object to be specified; and comparing the processed image data and the expected data to determine whether or not the object is detected correctly in the processed image data, wherein the expected data is referred to and the captured image data is processed through image processing, to detect the object in the background, the image processing being processing with an adaptive binarization filter, the size of a local area of the adaptive binarization filter is reduced as similarity between a color of the object represented by the expected data and a color of the background represented by the expected data is low, and when the shape of the object detected in the processed image data differs from a shape of the object represented by the expected data, the expected data is referred to, to modify the shape of the object detected in the processed image data.

10. The image processing device according to claim 1, wherein the processor executes processing with the adaptive binarization filter only on a predetermined area including the object represented by the expected data, the predetermined area being a portion of the captured image.

11. The image processing device according to claim 1, wherein the processor executes processing with the adaptive binarization filter only on a predetermined area including an edge of the object represented by the expected data, the predetermined area being a portion of the captured image.

* * * * *